United States Patent
Cullen et al.

(10) Patent No.: US 6,241,056 B1
(45) Date of Patent: Jun. 5, 2001

(54) COMPOSITE BRAKE DRUM

(75) Inventors: Jerry Cullen, Haslett; Ross S. Hill, Lansing; James Wieland, Mason, all of MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/222,211

(22) Filed: Dec. 29, 1998

(51) Int. Cl.[7] .................................................. F16D 65/10
(52) U.S. Cl. ...................... 188/218 R; 188/74; 29/527.5
(58) Field of Search ............................ 188/218 R, 325, 188/78, 74; 29/527.5, 527.6; 192/107 M

(56) References Cited

U.S. PATENT DOCUMENTS

| | | | |
|---|---|---|---|
| 2,493,173 | * | 1/1950 | Van Halteren .................. 188/218 R |
| 3,841,448 | * | 10/1974 | Norton, Jr. ...................... 188/218 R |
| 4,008,517 | * | 2/1977 | Schrader et al. ................... 29/527.6 |
| 4,266,638 | | 5/1981 | Petersen et al. . |
| 4,577,734 | * | 3/1986 | Williams .......................... 188/218 R |
| 4,732,240 | | 3/1988 | Flaim . |
| 4,858,731 | | 8/1989 | Bush . |
| 5,115,891 | | 5/1992 | Raitzer et al. . |
| 5,259,486 | | 11/1993 | Deane . |
| 5,261,511 | | 11/1993 | Libsch et al. . |
| 5,285,874 | | 2/1994 | Revyn . |
| 5,372,222 | | 12/1994 | Rhee et al. . |
| 5,385,216 | | 1/1995 | Kulczycki . |
| 5,509,510 | | 4/1996 | Ihm . |
| 5,603,784 | | 2/1997 | Bay . |
| 5,927,447 | * | 7/1999 | Dickerson .................... 188/218 R |

FOREIGN PATENT DOCUMENTS

| | | |
|---|---|---|
| 0 616 667 B1 | 1/1996 | (EP) . |
| 0 781 935 A2 | 7/1997 | (EP) . |
| 768711 | 3/1934 | (FR) . |

* cited by examiner

Primary Examiner—Robert J Oberleitner
Assistant Examiner—Pamela J. Rodriguez
(74) Attorney, Agent, or Firm—Marshall & Melhorn, LLC

(57) ABSTRACT

A composite brake drum for a motor vehicle or the like. The brake drum has a drum body that is comprised of a first material, preferably a cast metal, such as gray iron. The drum body has a cylindrical section, a shoulder, and a mounting face. The brake drum also includes an annular band formed from a second material, preferably a stamped metal such as steel. The annular band encircles the cylindrical section of the drum body. The steel annular band is positioned in a mold apparatus and molten iron is introduced into a mold cavity defined thereby. The mold and annular band are maintained in a static condition during the casting process.

20 Claims, 3 Drawing Sheets

COMPOSITE BRAKE DRUM

BACKGROUND OF THE INVENTION

The present invention relates generally to the manufacture of motor vehicle brake drums and, in particular, to the manufacture of composite brake drums.

Virtually all wheeled vehicles are provided with a brake system for selectively inhibiting the rotation of the wheels and, therefore, slowing the movement of the vehicle. To accomplish this, a typical vehicle brake system includes a friction brake assembly which is provided at one or more of the vehicle wheels. Upon actuation by a driver of the vehicle through manual movement of a brake pedal and an associated pneumatic or hydraulic actuating system, the friction brake assemblies are effective to inhibit the rotation of the vehicle wheel.

Such vehicle friction brake assemblies are generally classified into two types, namely, drum brake assemblies and disc brake assemblies. In a drum brake assembly, a hollow cylindrical drum is secured to the wheel of the vehicle for rotation therewith, while a brake shoe assembly is secured to the nonrotatable components of the vehicle. The brake shoe assembly includes a pair of arced friction shoes which are operatively connected to a pneumatically or hydraulically actuated piston. The friction shoes are disposed within the hollow drum adjacent to an inner cylindrical surface (A.K.A. braking surface) thereof. The friction shoes are normally spaced apart from the braking surface of the drum. When the driver of the vehicle manually moves the brake pedal, the piston is actuated to move the friction shoes apart from one another into frictional engagement with the braking surface of the drum. As a result, rotation of the drum and its associated wheel are inhibited.

In the past, drums and rotors of the type described above have been formed from gray iron using a conventional "as-cast" method. The "as-cast" method simply involved casting molten gray iron into the desired shape of the drum or rotor and subsequently cooling, followed only by cleaning and machining when necessary. Thus, the "as-cast" method has been found to be desirable because it is a relatively simple and inexpensive method to perform. Also, gray iron has been found to be an acceptable material to use in the "as-cast" method because it provides the resultant drums and rotors with sufficient mechanical and physical properties for use in the frictionbrake assemblies, such as hardness, strength, wear resistance, thermal conductivity, and the like.

Motor vehicle brake drums are often formed entirely of cast gray iron. However, while cast gray iron is the preferred material for the braking surface of the brake drum, a full cast brake drum is relatively heavy. Another problem with fully cast iron brake drums are that they are brittle. This brittleness can lead to heat check crack-through and breakage, resulting in brake drum disintegration.

At least in response to the desire for lighter vehicle components, composite brake drums have been developed which comprise of a stamped steel drum back and a rolled steel annular band surrounding a cast iron braking surface. These drums are mostly steel. In a typical composite cast iron is only used to form the braking surface, the rest of the brake drum is composed of steel.

The structure and method of manufacture of such composite brake drums are known. In accordance with the conventional practice, these composite brake drums are manufactured by first forming an annular band from sheet steel stock which is then rolled to the desired configuration, typically having a radially inwardly-turned end flange and a plurality of outwardly directed strengthening ribs. In addition to providing strength, the strengthening ribs also increase the surface area to dissipate heat and improve the cooling capabilities of the brake drum.

With the annular steel band externally fixed, molten gray iron is centrifugally cast therein to form a metallurgically bonded composite brake ring. After the ring has cooled, a steel drum back is generally welded to the flange. The radially inwardly directed braking surface of the ring is then finish machined.

While the conventional centrifugal casting method yields quality composite brake drums, it would be advantageous to provide an improved method of manufacturing a brake drum which is less expensive then the current centrifugal casting. It is also advantageous to produce such a composite brake drum which will operate under cooler and cleaner conditions to increase the useful life of the brake drum.

SUMMARY OF THE INVENTION

The invention is an article of manufacturing of a composite brake drum for a motor vehicle or the like which includes a drum body formed of a first material. The drum body includes a mounting face, a shoulder, and a cylindrical section. The brake drum also includes a second material, preferably a stamped metal such as steel. The second material is used to form an annular band that acts as the outer mold of the braking surface. The steel is preferably formed by rolling. The drum body is statically casted. Optional fins may be cast onto an inside surface of the shoulder to increase the useful life of the brake drum.

BRIEF DESCRIPTION OF THE DRAWINGS

The advantages of the invention will become readily apparent to those skilled in the art from the following detailed description of the preferred embodiments when considered in the light of the accompanying drawings, in which.

DETAILED DESCRIPTION OF THE PREFERRED EMBODIMENTS

The present invention relates to a method of manufacturing and article of manufacturing of a composite brake drum for a motor vehicle or the like. It is to be understood that the specific device illustrated in the attached drawings and described in the following specification is simply an exemplary implementation of the invention defined in the appended claims. Hence, specific dimensions and other physical characteristics relating to the embodiments disclosed herein are not to be considered as limiting, unless the claims expressly state otherwise.

Figure 1:
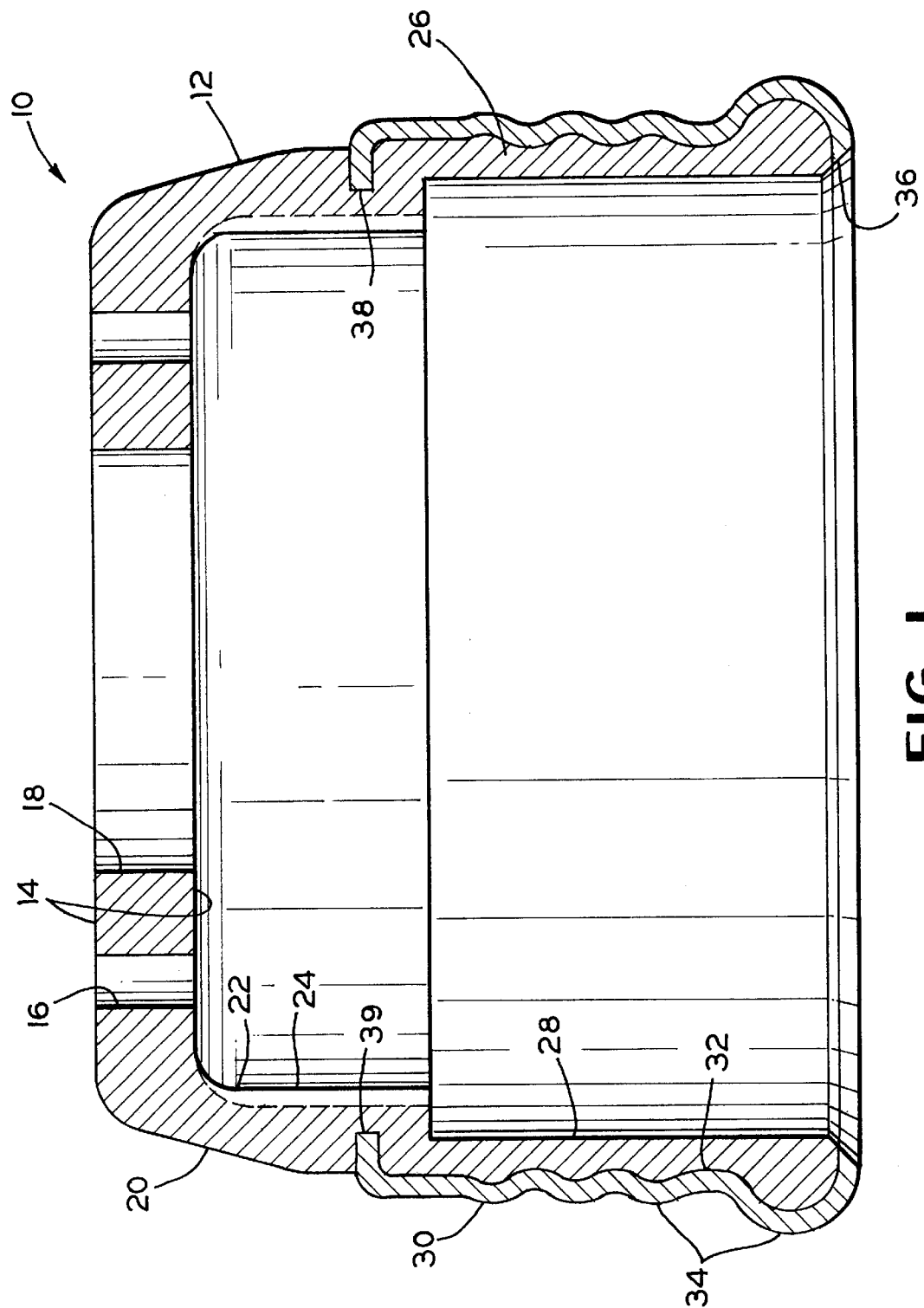
FIG. 1 is a diametrically sectioned perspective view of a finished brake drum in accordance with the invention.

Referring now to the drawings, there is illustrated in FIG. 1, a composite brake drum formed in accordance with the invention and generally designated by the reference numeral 10. The composite brake drum 10 includes a drum body 12, formed from a first material. Preferably the first material is gray iron. However, the present invention is not limited to the use of gray iron. Preferably, the drum body is statically casted, though other techniques for forming a drum body may be used to practice this invention. The drum body 12 is the shape of a conventional brake drum.

The drum body 12 includes mounting faces 14, constructed from the first material. The mounting faces 14 include a plurality of fastener apertures 16. The plurality of fastener apertures 16 receive studs (not shown) for mounting the brake drum 10 to a vehicle. As such, each fastener aperture 16 is aligned such that each fastener aperture 16 may receive a stud from the vehicle for mounting. The plurality of fastener apertures 16 are commonly known as bolt holes. This type of mounting is conventional. The mounting faces 14 also include a central aperture 18. The central aperture 18 is disposed concentrically to the mounting faces 14. The function of the central aperture 18 is conventional.

The drum body 12 further includes a shoulder 20 with an inner surface 22. The shoulder 20 annularly extends from the mounting faces 14. A plurality of fins 24 may be formed or mounted on the inner surface 22. The shoulder 20, the inner surface 22, and the plurality of fins 24 are all constructed from the first material. The plurality of fins 24 move air around the inner surface 22 when the drum turns. The moving air transfers heat away from the drum 10 to cool the drum 10 and increase it's useful life. The moving air also removes dirt and brake dust from the drum 10 which also increases the useful life of the brake drum 10. The plurality of fins 24 is not required to practice this invention The plurality of fins 24 are typically straight fins. Optionally, the plurality of fins 24 may be angled. Angled fins increase the turbulence of the air flow. However if the fins are angled, the respective brake drum is limited to use on one side of a vehicle.

Alternatively, the shoulder 20 may include a plurality of fin apertures (not shown) disposed adjacent each fin 24. The plurality of fin apertures are designed to increase airflow around each fin 24. However, the plurality of fin apertures is not necessary to practice this invention.

Furthermore, the drum body 12 includes a generally cylindrical section 26. The cylindrical section 26 extends from the shoulder 20 and is also formed from the first material. An annular braking surface 28 is disposed on the radially inner surface of the cylindrical section 26. As stated above, movement of a vehicle is inhibited by brake shoes (not shown) pressing against the internal annular braking surface 28. This type of use and location of a braking surface is conventional.

The brake drum 10 also includes an annular band or shell 30. The annular band 30 is composed of a second material, preferably a stamped metal such as steel. The annular band 30 is disposed on the radially outer surface of the cylindrical section 26 of the drum body 12, preferably encircling it.

The annular band 30 is metallurgically bonded to the drum body 12, preferably to the shoulder 20 and to the cylindrical section 26. However, it is not required that the annular band 30 is metallurgically bonded to both the shoulder 20 and the cylindrical section 26 to practice this invention.

The use of steel as the second material as compared to an entire gray iron brake drum has several advantages. As previously stated, steel helps reduce the weight of the brake drum 10. Steel will also improve the cooling rate. Steel is a more conductive material than cast gray iron. Thus steel will more quickly dissipate heat than will gray iron. Thus brake drum 10 will cool faster.

Steel also improves the shatterproof characteristic of a brake drum. Steel is more resistant to heat stress cracking than gray iron. Thus, the use of a steel annular band reduces the possibility of stress cracks in a brake drum.

The annular band 30 also includes an inner surface 32. The annular band further includes an optional plurality of annular, radially outwardly directed strengthening ribs 34. The strengthening ribs 34 provide strength to the structure of a brake drum and improve the cooling efficiency of a brake drum. The strengthening ribs 34 increase the surface area of a brake drum. Correspondingly, a greater surface area allows more surface area for heat transfer to occur. Therefore, a brake drum with strengthening ribs can dissipate more heat than one without the strengthening ribs.

The annular band 30 includes a first peripheral edge 36 and a second peripheral edge 38. The second peripheral edge 38 is adjacent the shoulder 20. The first peripheral edge 36 is opposite the shoulder 20.

The annular band 30 may optionally have a plurality of dovetails 39, disposed adjacent the shoulder 20. Each dovetail 39 is bonded into the shoulder 20 to improve the bonding between the band and the drum body. Optionally, each dovetail 39 may be twisted to further enhance the bond between the shoulder 20 and each of said plurality of dovetails 39.

Figure 2:
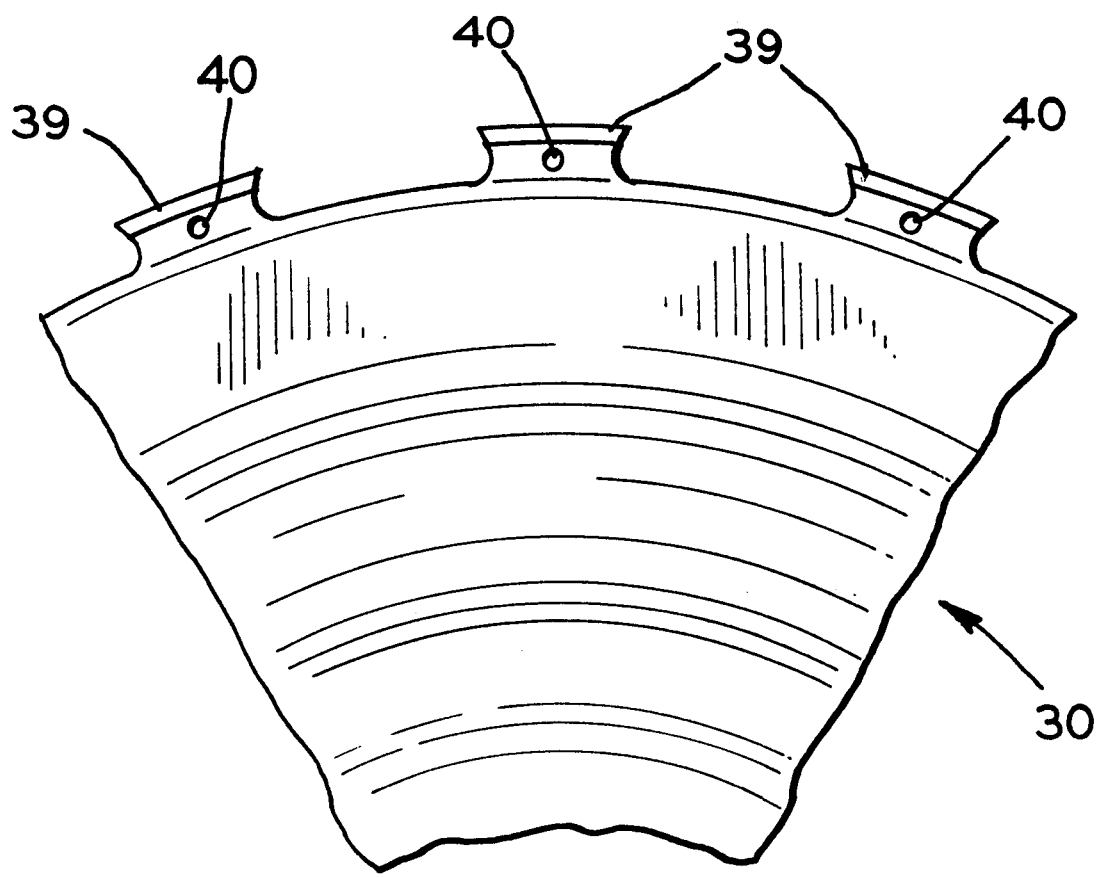
FIG. 2 is a plan view of a section of an annular band which includes a plurality of dovetails.

Additionally, each dovetail 39 may include an aperture 40, as shown in FIG. 2. Each aperture 40 improves bonding between the annular band 30 and the drum body 12. The first material is typically casted through the aperture 40.

A mold apparatus (not shown) is used for forming the composite brake drum 10 in accordance with the invention. The mold apparatus may be of any type suitable for static casting of the drum, such as the type used in sand casting, permanent mold casting, or lost foam casting, for example.

Figure 3:
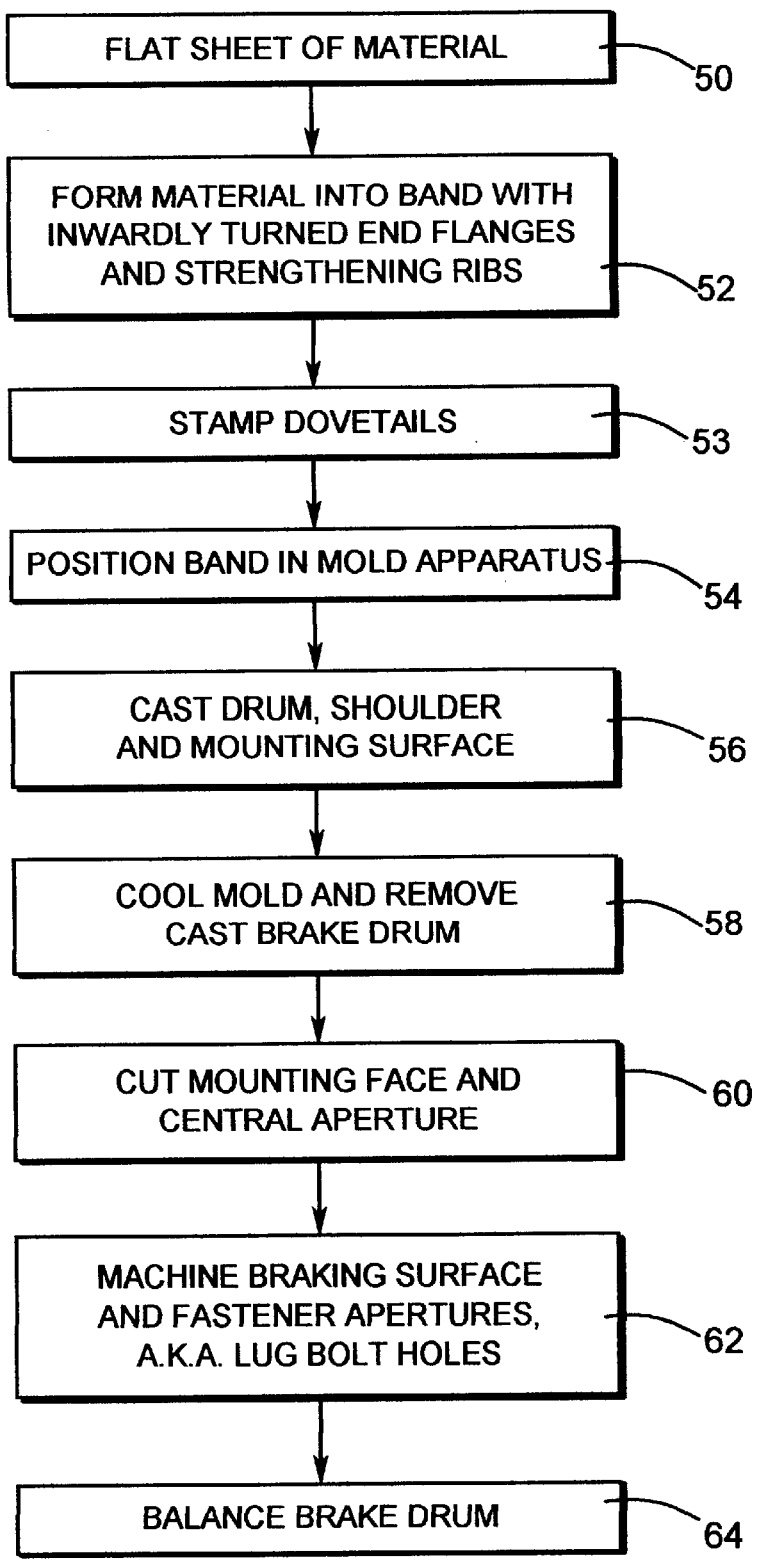
FIG. 3 is a block diagram illustrating the sequence of steps for producing the brake drum illustrated in FIG. 1.

FIG. 3 indicates the steps in the manufacture of a composite brake drum 10 in accordance with the invention. First, a flat sheet of material is provided 50.

The flat sheet of material is formed 52 into the annular band 30 and rolled into a configuration having the first peripheral edge 36, second peripheral edge 38, and the plurality of annular strengthening ribs 34. Optionally, the plurality of dovetails 39 are stamped 53 from the annular band 30. If the aperture 40 is desired, it is also stamped from the annular band 30 during the stamping step 53.

The band 30 is then positioned 54 within the mold apparatus. Molten iron is delivered 56 to the mold apparatus. The molten iron flows into a space defined by the inner surface 32 of the annular band 30 and the surface of the mold member, filling the same. Prior to the introduction of the molten iron, optionally the annular band 30 may be heated and/or fluxed (not shown) to improve the metallurgical bond between the annular band 30 and the drum body 12.

After the resulting composite brake drum 10 has sufficiently cooled, it is removed 58 from the mold apparatus. The mounting faces 14 and central aperture 18 are cut 60 from the drum body 12. Next, the braking surface 28 and the plurality of fastener apertures 16 are machined 62 from the drum body 12. Lastly, the brake drum is balanced 64.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A composite brake drum for use in a drum brake assembly comprising:

a brake drum body formed from a first material and cast as one piece, said brake drum body including a mounting face, a shoulder extending from said mounting face, and a cylindrical section extending from said shoulder; and an annular band formed from a second material and having a peripheral edge extending radially inwards into the surface of said cylindrical section for securing said band to said brake drum body.

2. A composite brake drum as defined in claim 1 wherein said cylindrical section and said shoulder are bonded to said annular band by static casting.

3. A composite brake drum as defined in claim 2 wherein said annular band includes a plurality of dovetails integrated into said shoulder.

4. A composite brake drum as defined in claim 3 wherein at least one of said plurality of dovetails includes an aperture for allowing the first material to flow therethrough to improve the retention of the band to the brake drum body.

5. A composite brake drum as defined in claim 3 wherein each one of said plurality of dovetails is twisted.

6. A composite brake drum as defined in claim 1, wherein said mounting face includes a central aperture and a plurality of fastener apertures.

7. A composite brake drum as defined in claim 1, wherein said shoulder further includes an inside surface having a plurality of fins mounted to said inside surface of said shoulder.

8. A composite brake drum as defined in claim 1, wherein said first material is gray iron.

9. A composite brake drum as defined in claim 1, wherein said second material is steel.

10. A composite brake drum as defined in claim 1, wherein said annular band further includes a plurality of strengthening ribs.

11. A composite brake drum as defined in claim 10, wherein said strengthening ribs are radially outwardly directed.

12. A composite brake drum as defined in claim 1, wherein said cylindrical section includes a braking surface opposed to said annular band.

13. A composite brake drum as defined in claim 1, wherein said braking surface is an annular surface.

14. A composite brake drum as defined in claim 1, wherein said braking surface is radially inwardly directed.

15. A method of manufacturing a composite brake drum comprising:

providing a mold for a brake drum body;

providing a flat piece of material made from a second material;

forming the flat piece into an annular band having first and second radially inwardly turned peripheral edges and an inner surface disposed therebetween;

placing the annular band within the mold; and delivering a first material into the mold such that the first material flows into the space defined by the mold and the inner surface of the band to form a cast drum body.

16. The method of manufacturing a composite brake drum defined in claim 15 further comprising machining a braking surface on the drum body.

17. The method of manufacturing a composite brake drum as defined in claim 15 further comprising stamping a plurality of dovetails on one of the peripheral edges of the annular band.

18. A method of manufacturing a composite brake drum as defined in claim 17 further comprising stamping an aperture in at least one of the plurality of dovetails.

19. A method of manufacturing a composite brake drum as defined in claim 17 further comprising twisting at least one of the plurality of dovetails.

20. A method of manufacturing a composite brake drum as defined in claim 15 farther comprising heating the annular band prior to delivering the first material into the mold.

* * * * *